US006240626B1

(12) United States Patent
Nghiem

(10) Patent No.: US 6,240,626 B1

(45) **Date of Patent: *Jun. 5, 2001**

(54) PRESSING DEVICE

(75) Inventor: Xuan Luong Nghiem, Krefeld (DE)

(73) Assignee: Novopress GmbH Pressen und Presswerkzauge & Co. KG (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/026,771

(22) Filed: Feb. 20, 1998

(30) Foreign Application Priority Data

Feb. 21, 1997 (DE) .................................... 297 03 052
Aug. 23, 1997 (EP) .................................... 97114623

(51) Int. Cl.[7] .................................... B23P 21/00

(52) U.S. Cl. .................................... 29/701; 29/702; 29/706; 29/708; 29/282

(58) Field of Search .................................... 318/560; 29/702, 29/706, 707, 708, 709, 714, 715, 282, 283.5, 701

(56) References Cited

U.S. PATENT DOCUMENTS 4,647,827 * 3/1987 Toyoda .................................... 318/592
4,968,923 * 11/1990 Busujima .................................... 318/560
5,032,778 * 7/1991 Yamada .................................... 318/560
5,079,489 * 1/1992 Ishii .................................... 318/560
5,250,884 * 10/1993 Okimura .................................... 318/560
5,283,943 * 2/1994 Aguayo .................................... 29/701
5,455,495 * 10/1995 Bec .................................... 318/560
5,487,215 * 1/1996 Ladouceur .................................... 29/702

FOREIGN PATENT DOCUMENTS 1187870 10/1965 (DE) .
2136782 7/1971 (DE) .
3423283 1/1986 (DE) .
29604276 6/1996 (DE) .
29613654 11/1996 (DE) .
0291329 11/1988 (EP) .
0361630 9/1989 (EP) .
0451806 10/1991 (EP) .
0582543 7/1993 (EP) .
WO 93/13935 7/1993 (WO) .

* cited by examiner

*Primary Examiner*—Irene Cuda
*Assistant Examiner*—Anthony L. Green
(74) *Attorney, Agent, or Firm*—Liniak, Berenato, Longacre & White, LLC

(57) ABSTRACT

A pressing device for joining workpieces has a pressing tool and a motorized drive for actuation of the pressing tool over a pressing distance, as well as a control device which has a drive control device for influencing the drive. The drive control device has a malfunction detection device which has an actual value sensor which is suitable for detecting, as the actual value, a physical magnitude which is correlated with the pressing resistance. At least one limit value profile for the actual value is retained in the malfunction detection device, and it has a comparison device which, during a pressing, checks whether the particular actual value lies on the permissible or impermissible side of the pertinent limit value profile. The malfunction detection device comprises a signal device and/or a shutdown device for the drive, which are/is activated if the actual value lies on the impermissible side of the pertinent limit value.

34 Claims, 5 Drawing Sheets

PRESSING DEVICE

The invention concerns a pressing device for joining workpieces, having a pressing tool and a motorized drive for actuation of the pressing tool over a pressing distance, and having a control device which has a drive control device for influencing the drive.

It is known, in order to join pipes, to use sleeve-like press fittings which, in order to produce a pipe joint, are slid over the pipe ends and then radially compressed, both the press fitting and the pipe being plastically deformed. Pipe joints of this kind and the pertinent press fittings are known, for example, from DE-C-11 87 870, EP-B-0 361 630, and EP-A-0 582 543.

Pressing takes place with the aid of pressing devices such as are known in various embodiments, for example from DE-C-21 36 782, DE-A-34 23 283, EP-A-0 451 806, EP-B-0 361 630, and DE-U-296 04 276.5. The pressing devices have a pressing jaw unit having at least two or sometimes more pressing jaws, which during the pressing operation are moved radially inward to form a substantially closed pressing space. The pressing tool is attached replaceably to the other part of the pressing device so that a pressing tool matching the diameter of the press fitting can be used in each case.

An electric drive, which additionally can also be combined with a hydraulic unit, is provided for movement of the pressing jaws. In the context of a pressing operation, the drive travels over a pressing distance which usually initially begins with a takeup distance before the pressing jaws come into contact against the press fitting. Over the rest of the pressing distance, the press fitting and pipe end are deformed until a final pressed position is reached. Here the drive is automatically shut down, either by means of a force limiting element, for example in the form of a torque coupling, or a hydraulic switching valve, or by means of a limit switch in combination with a jaw closure sensor on the pressing tool (DE-U-296 02 240.3).

The purpose of each pressing is to avoid mispressings, since they generally result in a leaky pipe connection, which in the case of liquid-carrying pipelines can cause major damage. Mispressings can have various causes; said causes for the most part cannot be detected with the known pressing devices, so that a mispressing effected because of such a cause goes unnoticed.

A situation of this kind exists when a pressing device is used, with a certain pressing tool, to press a press fitting which does not match the pressing tool, i.e. is either too large or too small. In both cases, mispressings occur, which can result in leaks. The mispressings cannot be noticed since both the final force and the final pressed position are reached.

Creasing can also occur in the region of the end faces of two adjacent pressing jaws. Since it usually occurs at the end of the pressing distance, it is difficult for the operator to notice, particularly if the pressing device is switched off by means of a force limiting element. Small creases may also not be noticed even if a limit switch is provided, particularly if the limit switch is arranged in the region of two pressing jaws where creasing does not occur. This applies if foreign objects such as dirt or other solid particles become lodged in the pressing tool, and jam the movement of the pressing jaws.

Mispressings can also occur if a pipe end is not inserted sufficiently into the press fitting. In pressing devices which do not have a special monitoring element for the purpose, this also goes unnoticed and usually results in a mispressing.

It may also happen that a breakage occurs in the force-affected parts of the drive. This can result in a sudden elevation in the rotation speed, causing the pressing device to constitute a hazard.

A special problem is represented by interruption of a pressing operation, for example due to a power failure. When pressing is then resumed, a long takeup distance must be covered, which takes time and, depending on how the drive is controlled, lead to the buildup of high kinetic energies, with the risk that the pressing jaws will strike abruptly against the only partly pressed press fitting.

It is the object of the invention to configure a pressing device of the kind cited initially in such a way that mispressing are eliminated with greater reliability, or at least can be recognized.

This object is achieved, according to the invention, by means of a pressing device having the following features:

- the drive control device has a malfunction detection device;
- the malfunction detection device has an actual value sensor;
- the actual value sensor is suitable for detecting, as the actual value, a physical magnitude which is correlated with the pressing resistance;
- at least one limit value profile is retained in the malfunction detection device;
- the malfunction detection device has a malfunction comparison device which, during a pressing, checks whether the particular actual value lies on the permissible or impermissible side of the pertinent limit value profile;
- the malfunction detection device comprises a signal device and/or a shutdown device for the drive, which are/is activated if the actual value lies on the impermissible side of the limit value.

Preferably at least one upper and at least one lower limit value profile are retained, constituting a limit value corridor. These can also be limit values which remain constant. It is preferable, however, for the limit value profiles to be matched to the profile of the actual value for a correct pressing, constituting a limit value corridor.

The basic idea of the invention is thus, in the case of a pressing device, of the species, to provide a malfunction detection device which, when a physical magnitude correlating with the pressing resistance deviates from a standard profile, leads to creation of a signal and/or to a shutdown of the drive. In this context, the signal can be created visibly or audibly, in the simplest case as the sounding or flashing of an alarm light or alarm buzzer, but also, depending on the type of malfunction, as a differentiated signal or even a display with a readable malfunction message, or in the form of a spoken output. The operator thus receives more or less specific information that a malfunction is present and that the pressing operation should therefore be interrupted for further checking. Instead of or in combination with the signal, automatic shutdown of the drive can also occur, so that the pressing operation can at least not be continued immediately. It is evident that the malfunction detection device according to the invention yields much greater protection against mispressings, which is extraordinarily important in terms of the great potential for damage as a result of such mispressings.

The physical magnitude correlating with the pressing resistance is advantageously selected to match the characteristics of the drive. For drives that are not output-controlled, an obvious choice is to detect the rotation speed of the drive, since it changes with the pressing resistance. For example, if jamming of the drive occurs before the end of the pressing distance due to creasing of the press fitting or the presence of foreign objects, the rotation speed departs from the permissible limit value corridor downward; in such cases it is advisable to activate the shutdown device. A considerable drop in rotation speed with departure from the limit value corridor is also a consequence of pressing a press fitting that is too large for the pressing jaws. The rotation speed rises, conversely, when too small a press fitting is acted upon, when the pipe end is not inserted far enough into the press fitting, or when a breakage occurs.

Instead of detecting the rotation speed as the physical magnitude, it is also possible to directly detect the force being applied, for example by means of strain gauges, or, analogously, the torque being applied. Lastly, the average electrical current is suitable as an indicator of the pressing resistance, since the former also changes along with the latter.

In a further embodiment of the invention, provision is made for at least one further upper and/or lower limit value profile to be retained, lying respectively on the impermissible side of the first limit value profile. One narrower and one wider limit value corridor are thus constituted, which can be used to activate the signal device and the shutdown device depending on which limit value corridor is departed from toward the impermissible side. Provision can thus be made, for example, for activating only the signal device if the narrow limit value corridor is departed from, and activating the shutdown device only if a departure occurs from the wider corridor. The wider limit value corridor can be configured so that it is not departed from when pressing press fittings which are too large or too small, but only, for example, in the event of a breakage or jam, i.e. in the event of a comparatively serious malfunction.

In a further embodiment of the invention, provision is made for the signal device to be able to generate various signals, and for the limit value profile or at least one limit value profile to be divided into regions over the pressing distance (or, correlating therewith, over the pressing time), a specific signal output being allocated to each region. This makes it possible to account for the fact that certain malfunctions usually occur only in certain regions. For example, creasing of the press fitting or jamming due to foreign objects or contamination generally occur only toward the end of the pressing. Pressing of too large a press fitting, on the other hand, leads very quickly to a rise in pressing resistance, while pressing of too small a press fitting results in a long takeup distance phase with high rotation speeds and, upon encountering the press fitting, a relatively small drop in rotation speed compared with pressing of a press fitting of the correct size. Appropriate division of the regions provides the operator with specific information about the malfunction which is highly reliable, so that it can then be remedied correctly.

It is particularly advantageous if the malfunction detection device according to the invention is combined with an output control device as part of the drive control device, there being retained as the command variable a setpoint profile by means of which a manipulated variable corresponding to the setpoint profile is generated in order to influence the output control device.

A drive control device of this kind is disclosed in DE-U-297 03 052.3, referring to previously unpublished German Patent Application 196 33 199.4. With this, the output of the drive can be limited in such a way that at least toward the completion of pressing, the pressing tool has less kinetic energy than without output control. The result of this feature is that the maximum force acting on the parts of the pressing device moved by the drive is considerably decreased, and ideally is identical to the maximum force to be applied during deformation of the workpieces.

In a simple embodiment, the setpoint profile can have two stages, such that in the first phase of the pressing distance, and in particular when the takeup distance is being traveled, a low output is specified, which is then increased when the press fitting is acted upon, in accordance with the pressing resistance which thereby occurs. By storing a plurality of control parameters—for example in the form of a table or matrix—the setpoint profile can nevertheless be matched very closely to the profile of the pressing resistance, in such a way that the stress on the force-affected parts of the pressing device, for example when the pressing jaws encounter the press fitting, and in particular at the end of the pressing distance, and thus also the gradual changes resulting from wear, are minimized. In combination with the malfunction detection device according to the invention, depending on the location and nature of the change in the physical magnitude being detected, malfunctions can be detected relatively precisely and can also be indicated in differentiated fashion.

The output control device and the setpoint profile or profiles can be configured as parts of a sequence control system without feedback. In this, the output control device receives, in accordance with a desired profile of the physical magnitude that correlates with the pressing resistance, a specified output—for example by adjustment of the phase angle in the case of a triac as the output control element, or of the pulse width modulation in the case of a transistor—that leads, in the case of a normal pressing, to a profile matched thereto. It is more advantageous, however, to provide instead of a sequence control system a servocontrol system, i.e. with feedback, in which the setpoint profile or each setpoint profile is enclosed by a control corridor, defining the control bandwidth, with upper and lower control boundaries. By means of such a servocontrol system it is possible to maintain a desired profile within narrow boundaries even if minor malfunctions occur, for example voltage fluctuations or different frictional coefficients at the press fitting. It is also possible to compensate for tolerances of the pressing tools, and gradual changes due to wear or contamination.

The advantage of this control system, particularly when the rotation speed of the drive is taken as the controlled variable, consists in the fact that with a normal pressing, the profile of the kinetic energy in the moving parts over the pressing distance is configured such that loads, especially in the bearings, are kept lower than is possible with a sequence control system. The pressing operation becomes, to this extent, independent of, for example, input-side voltage changes or changes in frictional coefficient in the bearings, at the pressing jaws, or at the press fitting itself, since they are stabilized by the control circuit. In this context, the setpoint profile should preferably be defined by a control corridor having upper and lower control limit values.

In the case of both the sequence control system and the servocontrol system, consideration may be given, not only to the rotation speed of the drive, but also to the force to be applied—and also, in the case of a hydraulic drive, the hydraulic pressure—and the torque to be applied and the average electrical current, may be considered as the magnitude correlating with the pressing resistance. It is particularly advantageous if the controlled variable is identical to the physical magnitude which correlates with the pressing resistance. In this case the limit value profiles for the physical magnitude can be matched particularly closely to the setpoint profile, since the control system ensures that the control corridor is not departed from in normal circumstances. In this fashion, a malfunction that can no longer be stabilized is detected relatively quickly, especially if the control boundaries are identical to the limit value profiles for the physical magnitude, i.e. the control corridor and the corridor enclosed by the limit value profiles are congruent. This particularly advantageous embodiment makes it unnecessary to store particular limit value profiles. The control system should then be set so that although certain deviations—for example in the event of fluctuations in tolerance, friction, or voltage—are stabilized, the malfunctions described above (for example pressing press fittings that do not fit the pressing jaws, or the occurrence of breakages or jams) can no longer be stabilized, so that the actual value of the controlled variable departs from the control corridor, with the result that the signal device and/or shutdown device is activated.

In pressing devices of the species, the pressing tools are usually replaceably installed on the drive part so that the drive part can be used for pressing press fittings and pipes of different diameters. In this context, the term "pressing tools" is understood also to mean replaceable pressing jaws within pressing jaw carriers. A single setpoint profile is, however, not optimal for all pressing tools, and the same is true for limit value profiles. Multiple limit value profiles, and optionally setpoint profiles, should therefore always be defined, and in particular stored, advantageously in such a way that for each type of pressing tool, limit value profiles, and optionally setpoint profiles, matched thereto are defined.

In addition, it may be advantageous to define the limit value profiles, and optionally also the setpoint profiles, for different properties of the workpieces. In order to allow a choice to be made automatically from the stored limit value profiles, and optionally the setpoint profiles, the pressing device should have a material sensor, for example in the form of an eddy-current sensor, for detecting the material of the workpieces. Utilization of the pressing device is thus not confined solely to the pressing of workpieces made of a certain material; rather it can also be used for other materials which are softer or harder, and therefore have a different pressing resistance.

Since the number of types of press fittings and pipe ends is usually not large, it may be sufficient to provide a manually operable switch arrangement for setting the setpoint profile and optionally the pertinent limit value profiles. It is particularly advantageous if the drive control device has a self-adaptation device by means of which the limit value profiles, and optionally the setpoint profile as well, can be adapted to the actual pressing resistance. Self-adaptation devices of this kind are known per se in control technology. They make it possible to shift the limit value profiles, and optionally also the pertinent setpoint profile, theoretically in parallel so as to match the actual pressing resistance, by performing a test pressing. In this test pressing, the self-adaptation device determines the deviation from the stored limit value profiles and sets the deviating values instead of the previously stored values.

The self-adaptation device should advantageously be capable of manual activation, so that self-adaptation is possible only when a test pressing is performed. This prevents erroneous limit value profiles or setpoint profiles from being stored. The self-adaptation device can advantageously be used, in particular, in conjunction with matching to other materials or wall thicknesses of press fittings and pipe ends, and for calibration on a new pressing device.

According to a further feature of the invention, provision is made for at least one setpoint profile to be retained for the complete pressing distance, and, for that or each of those setpoint profile(s), at least one further setpoint profile for a partial pressing distance after interruption of the pressing operation. In this fashion, a pressing operation that is interrupted can be continued with a different setpoint profile that is better matched to the conditions after a partial pressing, so as to minimize stresses on the force-affected parts. It is evident that a plurality of such setpoint profiles can be stored for each pressing tool, depending in each case on the pressing distance that has already been traveled when the pressing operation is interrupted. The particular appropriate setpoint profile is selected automatically by means of a corresponding distance or time detection system. In this context, matching limit value profiles are associated with said setpoint profile so that even after interruption of a pressing operation, a malfunction detection process matched to the new setpoint profile can occur.

In a simple embodiment, a manually operable switch arrangement can be provided for setting the particular limit value profiles, and optionally setpoint profiles. Operating errors cannot, however, be ruled out in this case. It is therefore advantageous if the basic idea evident from DE-U-297 03 052.3 is applied to the present invention, such that the pressing tool has a code by means of which the pertinent limit value profiles, and optionally the pertinent setpoint profile, are selected. This ensures that after replacement of the pressing tool, the limit value profiles—and, if control or regulation of the drive is provided for, the setpoint profile as well—which match it are selected. The code can be configured, in this context, as an electrical or electronic component which is connected to the drive apparatus via a transfer member. Examples may be seen in German Utility Model 297 03 052.3. A memory chip is particularly suitable as the code, since a plurality of different codes can be stored in it. There also exists, in this context, the possibility of retaining in said memory chip the limit value profile or profiles, as well as optionally a matching setpoint profile. The memory chip can then be configured, when the pressing tool is joined to the drive part of the pressing device, as part of the drive control system. Alternatively, however, a device for transferring the limit value profiles, and optionally the setpoint profile, into the drive control device may also be considered.

A memory chip of this kind can also be used to store the pressing distance—or, analogously, the pressing time—that is characteristic of the relevant pressing tool.

When the end of the pressing distance or pressing time is reached, a visible or audible signal can then be issued, and/or the drive can be shut down.

Alternatively, provision can be made for the pressing tool to have a position sensor, and for a partial pressing distance or partial pressing time to be stored in the memory chip, the drive being controlled in such a way that if the position sensor is activated, travel occurs only over the partial pressing distance. The pressing distance or partial pressing distance can be defined for a certain size of pressing tool. It is more advantageous, however, to determine the pressing distance or partial pressing distance experimentally for each pressing tool, and store the relevant value in the memory chip. This ensures that the pressing tool is moved to its final pressed position but not beyond it, regardless of deviations within manufacturing tolerances.

In a further embodiment of the invention, it is proposed that a locking device to immobilize the drive upon activation of the shutdown device be provided, such that the locking device cannot be bypassed until a special unlocking device is actuated. This embodiment is intended to prevent a pressing operation that has been interrupted from being continued by simply actuating the on/off switch again. The unlocking device can also be used to select the limit value profiles provided for resumed pressing, and optionally the matching setpoint profile, additionally in accordance with the pressing distance traveled prior to interruption of the pressing operation. In order to allow detection of the latter, a start sensor to detect the initial position of the pressing tool, and a distance sensor and/or time sensor, should be provided. A revolution counter is particularly suitable, in this context, as the distance sensor.

The invention is illustrated in more detail, with reference to an exemplifying embodiment, in the drawings, in which FIG. 1 shows the drive part of a pressing device, in longitudinal section;

Figure 1:
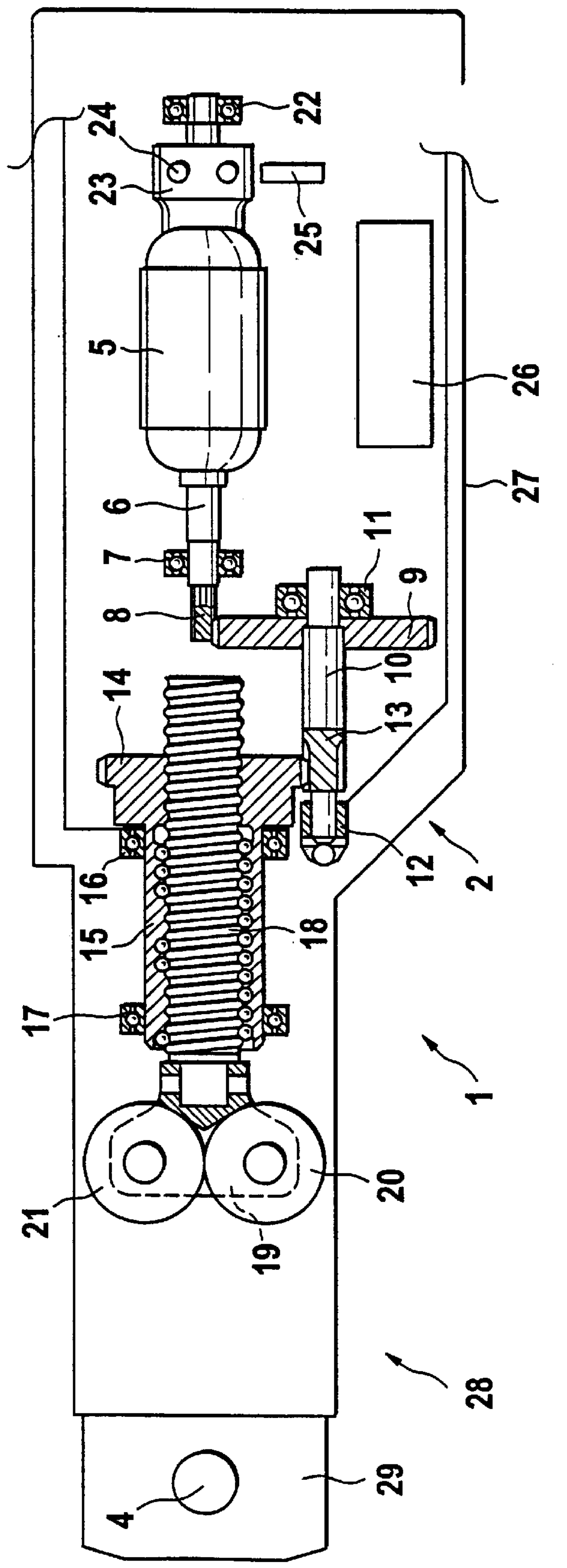
Figure 2:
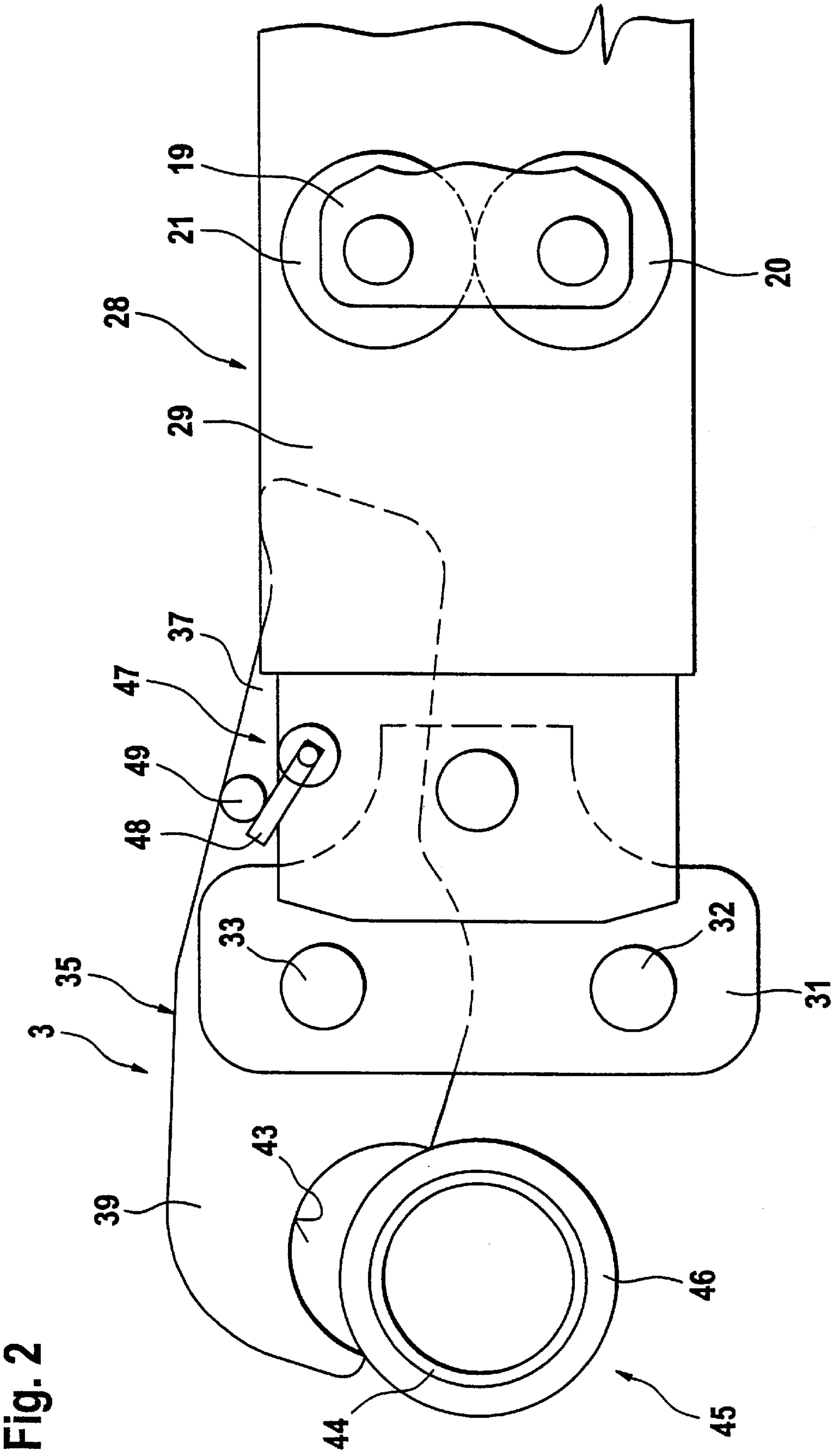
FIG. 2 shows the upper part of the drive part shown in FIG. 1, with a partially depicted pressing tool.
Figure 3:
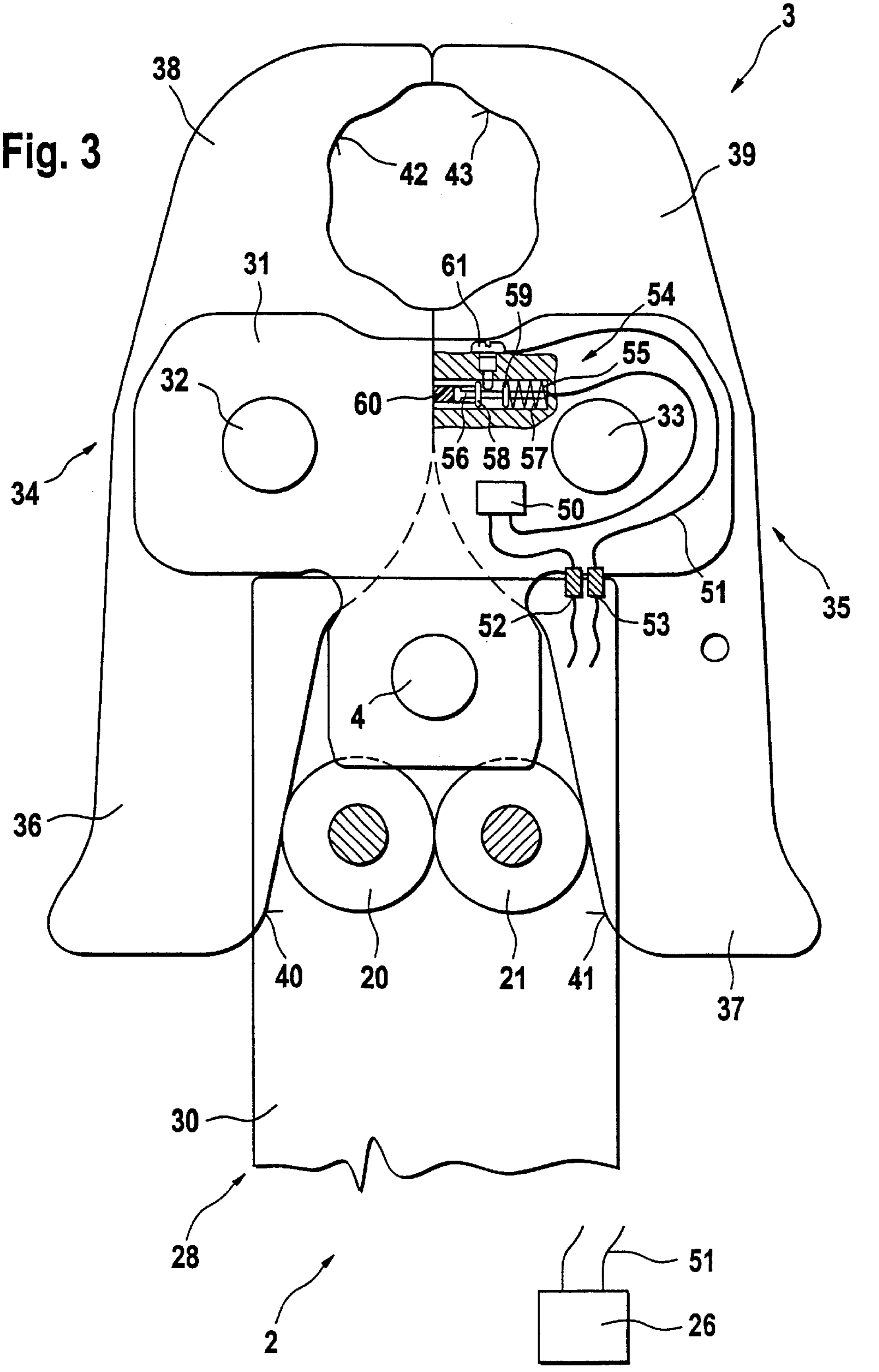
FIG. 3 shows the pressing tool as shown in FIG. 2, in an enlarged depiction.

Pressing device 1 shown in FIGS. 1 to 3 is constructed in two parts, and consists substantially of a drive part 2 and a pressing tool 3. The two are joined to one another in articulated fashion by means of a coupling bolt 4.

Located in drive part 2 is an electrical drive motor 5 having a drive shaft 6 which is mounted in a bearing 7, as best shown in FIG. 1. Arranged at the free end is a drive pinion 8 which meshes with a gear 9 which sits on a countershaft 10. Countershaft 10 is mounted rotatably in bearings 11 and 12. It carries a pinion 13 which meshes with a gear 14 that is part of a spindle nut 15. Spindle nut 15 is mounted, nondisplaceably axially, in bearings 16, 17. Passing through spindle nut 15 is a spindle 18 whose end located away from drive motor 5 is equipped with a fork head 19. Spindle nut 15 and spindle 18 mesh with one another in such a way that rotation of spindle nut 15 causes an axial displacement of spindle 18, thereby guiding spindle 18 nonrotatably.

Two drive rollers 20, 21 are mounted so as to rotate freely in fork head 19. Drive rollers 20, 21 are in peripheral contact with one another.

Drive shaft 6 also projects out at the rear end of drive motor 5, and is also mounted there in a bearing 22. It carries a rotation speed pickup 23 over whose circumference magnets 24 are distributed at equal intervals. Arranged opposite rotation speed pickup 23, mounted on the device, is a rotation speed sensor 25 which is capable of detecting the magnetic fields proceeding from magnets 24 and sends corresponding signals to a control device 26 which is depicted only schematically here. There the signals are counted; the number determined corresponds to the number of revolutions and thus to the distance traveled by spindle 18 and fork head 19. The time interval between two signals is moreover an indication of the instantaneous rotation speed of drive motor 5. Drive part 2 has a housing 27 that continues, toward pressing tool 3, into a retaining fork 28 having two congruent fork arms 29, 30, which are at a distance such that fork head 19 can move between them. The front fork arm 29 is omitted in FIG. 3.

Pressing tool 3 depicted in FIGS. 2 and 3 has two congruent support plates, arranged behind one another, of which only the front support plate 31 is visible here. The two support plates 31 have the same T-shape and project with their drive-side regions into the gap between fork arms 29, 30, where they sit on coupling bolt 4. Support plates 31 are spaced apart from one another and are joined to one another via bearing pins 32, 33. Sitting respectively on bearing pins 32, 33 are pressing jaw levers 34, 35 (pressing jaw lever 34 is omitted in FIG. 2) which are configured in mirror-image fashion and also assume mirror-image positions. Pressing jaw levers 34, 35 have drive arms 36, 37 proceeding toward drive part 2, and jaw arms 38, 39 proceeding upward, as best shown in FIG. 3. Drive arms 36, 37 have drive surfaces 40, 41 which coact with drive rollers 20, 21 during a pressing operation. Jaw arms 38, 39 have, on the sides opposite one another, semicircular recesses which assume the contours of pressing jaws 42, 43.

In FIG. 2, pressing jaw lever 35 (as well as pressing jaw lever 34 which is not shown) is pivoted into the open position, so that drive arms 36, 37 are located in the gap between fork arms 29, 30, and the spacing between pressing jaws 42, 43 is as large as possible. Nesting within one another between pressing jaw levers 34, 35, are a pipe end 44 and (on the outside) a press fitting 45 with its radially projecting annular bead 46. Annular bead 46 is located at the level of pressing jaws 42, 43, and is designed to be pressed radially inward by a pivoting movement of pressing jaw levers 34, 35, accompanied by plastic deformation of itself and pipe end 44.

A pressing operation is initiated, proceeding from the position shown in FIG. 2, in that drive motor 5 is set in motion by means of an externally actuable on/off switch. The rotary movement proceeding from it is converted in spindle nut 15 into a displacement movement of spindle 18, specifically such that fork head 19 is pushed toward pressing tool 3. A takeup distance must first be traveled before drive rollers 20, 21 come into contact against drive surfaces 40, 41. Because of the oblique position of drive shafts 40, 41, drive arms 36, 37 are then spread apart, and drive rollers 20, 21 move into the progressively widening gap between drive arms 36, 37. This in turn causes jaw arms 38, 39, and thus pressing jaws 42, 43, to approach one another, accompanied by compression of annular bead 46 of press fitting 45 and pipe end 44. FIG. 3 shows the final pressed position, in which drive rollers 20, 21 are at maximum excursion and the end faces of jaw arms 38, 39 have come into contact (press fitting 45 and pipe end 44 are not depicted in FIG. 3).

Control device 26 coacts with a limit switch 47 which is arranged on the outside of fork arm 29, as best shown in FIG. 2. Limit switch 47 has a switch arm 48 which coacts with an actuation projection 49 on drive arm 37 of pressing jaw lever 35. When pressing jaw levers 34, 35 are in the open position shown in FIG. 2, actuation projection 49 presses switch arm 48 into a position in which it signals to control device 26 that pressing jaw levers 34, 35 are in the initial position, i.e. open position. Proceeding from there, control device 26 can then perform a distance measurement via rotation speed pickup 23 and rotation speed sensor 25. A time measurement can also be initiated instead of a distance measurement.

Drive part 2 of pressing device 1 can be fitted, via coupling bolt 4 (which is removable), with various sizes of pressing tools 3. To allow control device 26 to detect the type and size of pressing tool 3, pressing tool 3 has a code, specifically in the form of an electrical resistor 50 which is located in a circuit 51, as best shown in FIG. 3. Resistor 50 can be arranged at a protected point on pressing tool 3. The portion of circuit 51 contained in pressing tool 3 continues, via spring contacts 52, 53, into control device 26 (symbolized in FIG. 3 simply as a block).

Resistor 50 has a resistance value which is specific for each pressing tool 3. Pressing tool 3 can thus be identified by a resistance measurement. The resistance measurement is performed with ordinary analog/digital converters.

Additionally located in circuit 51 is a jaw closure sensor 54 which is arranged in the right-hand pressing jaw lever 35, as best shown in FIG. 3. It has a blind hole 55 which is open toward the left-hand pressing jaw lever 34. In blind hole 55, a plunger 56 is arranged in horizontally displaceable fashion. It is acted upon, via a compression spring 57, by a force directed toward the left-hand pressing jaw lever 34.

Plunger 56 is guided in blind hole 55 via two spaced-apart annular flanges 58, 59, and ends in an electrically insulated rubber element 60. A contact screw 61 projects into the gap between the two annular flanges 58, 59. Both plunger 56 and contact screw 61 are part of circuit 51.

With pressing jaw levers 34, 35 in the open position of FIG. 2, the opposing surfaces of drive arms 36, 37 are spaced apart. Plunger 56 projects outward beyond the opening of blind hole 55 with rubber element 60. The right-hand annular flange 59 is in contact against contact screw 61, so that circuit 31 is closed. A resistance measurement to identify pressing tool 3 on the basis of the resistance of resistor 50 is thus possible.

When pressing jaw levers 34, 35 are closed as shown in FIG. 3, contact occurs during the last pressing phase (but before the final pressed position) between rubber element 60 and the opposite side of the left-hand jaw arm 38. As a result, plunger 56 is displaced correspondingly against the action of compression spring 57, with the result that electrical contact between plunger 56 and contact screw 61 is lost. Circuit 51 is interrupted. This creates a signal which is processed in control device 26 in the manner described below.

To detect a wire breakage in circuit 51, a second resistor whose value is clearly different from that of resistor 50 can be installed parallel to jaw closure sensor 54 and/or resistor 50. This prevents any signal confusion with the signal of jaw closure sensor 54.

Figure 4:
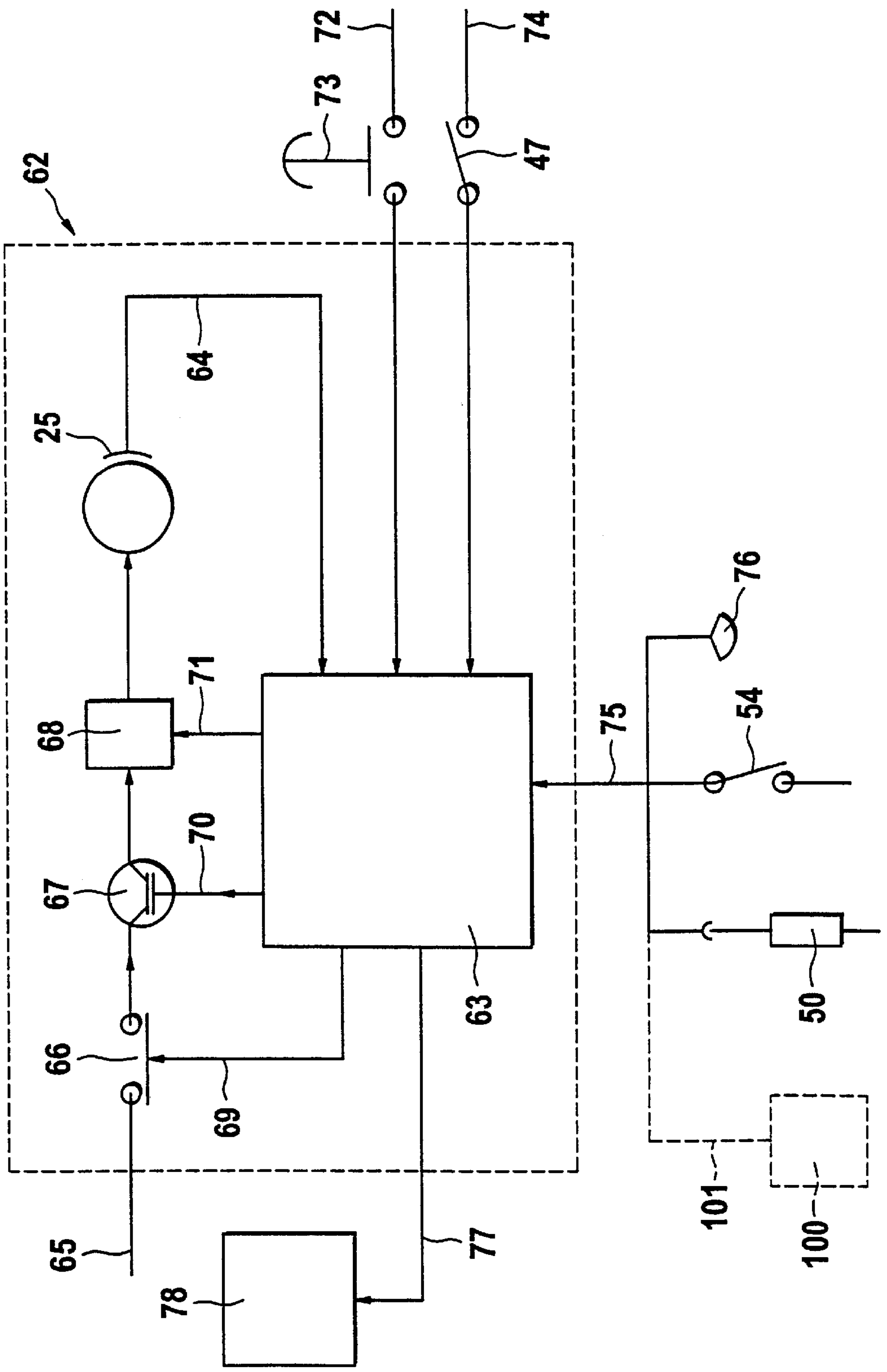
FIG. 4 shows a simplified depiction of the control system of the pressing device shown in FIGS. 1 to 3.

FIG. 4 shows a portion of control device 26, substantially drive control device 62 marked by the dashed box. The heart of drive control device 62 is a microprocessor 63. Operably associated with it is drive motor 5 with rotation speed sensor 25 as best shown in FIG. 1, from which a line 64 proceeds into microprocessor 63. Drive motor 5 is fed by a power supply line 65 which can be connected to the main power grid. Located in power supply line 65, in succession, are a shutdown element 66, an output control element 67 (here in the form of a transistor, for effecting a power reduction via pulse width modulation), and a motor reversal element 68 for determining rotation direction. Limit switch 66 is electrically connected via a line 69, output control element 67 via a line 70, and motor reversal element 68 via a line 71, to microprocessor 63.

Via a line 72, microprocessor 63 is connected to a manually actuable on/off switch 73 with which drive motor 5 can be started by means of microprocessor 63. Located in a further line 74 is limit switch 47, already described with reference to FIG. 2, for detecting the initial position of pressing tool 3.

Via a line 75, certain specifications are transmitted to microprocessor 63. These are on the one hand the code of pressing tool 3 via resistor 50, and on the other hand jaw closure sensor 54. Also provided is a selector switch 76 by means of which the manually determined boundary conditions for the operation of drive control device 62 can be defined.

A series of setpoint profiles—which can also be referred to as "characteristic curves"—are stored in microprocessor 63, for example in the form of functions or points for the rotation speed over the pressing distance. Each setpoint profile is specific for a certain pressing tool 3. When a certain pressing tool 3 is attached, the setpoint profile matching it is selected by means of the above-described check of resistor 50. This setpoint profile determines the manner in which drive motor 5 is controlled via output control element 67.

Rotation speed pickup 23, rotation speed sensor 25 of FIG. 1, and the pertinent line 64 of FIG. 4 belong to the control loop of a servocontrol system whose command variable is the particular setpoint profile and whose controlled variable is the rotation speed. From the aforementioned elements, a signal corresponding to the rotation speed of drive motor 5 is sent to microprocessor 63, in which said signal is then processed. In a comparison device of microprocessor 63, a check is made as to whether the actual rotation speed value lies inside or outside the control boundaries of a control corridor, and thus inside or outside the permissible region. In the former case, the specified phase angle of output control element 67, and thus the specified output, are maintained. In the latter case, the phase angle is modified by a certain amount, specifically such that the specified output is decreased if the rotation speed is too high, and increased if the rotation speed is too low.

The control system is designed so that under normal conditions, the control process described above causes the actual rotation speed value to be controlled back into the control corridor, and if possible into its center region. If it is determined at the next comparison, however, that the actual rotation speed value still lies outside the control corridor, a malfunction must be present. Such malfunctions can be, for example, the pressing of a press fitting of incorrect size, a pipe end that is not pushed completely into the press fitting, a break in the drive chain between drive motor 5 and pressing jaws 42, 43, or a jam due to trapped foreign objects or creasing at press fitting 45. Microprocessor 63 then emits a signal which, depending on the type of malfunction detected, passes via line 69 to limit switch 66, with the result that drive motor 5 is shut down and/or an output occurs via a line 77 to a display 78, where the malfunction is made visible in suitable fashion.

Figure 5:
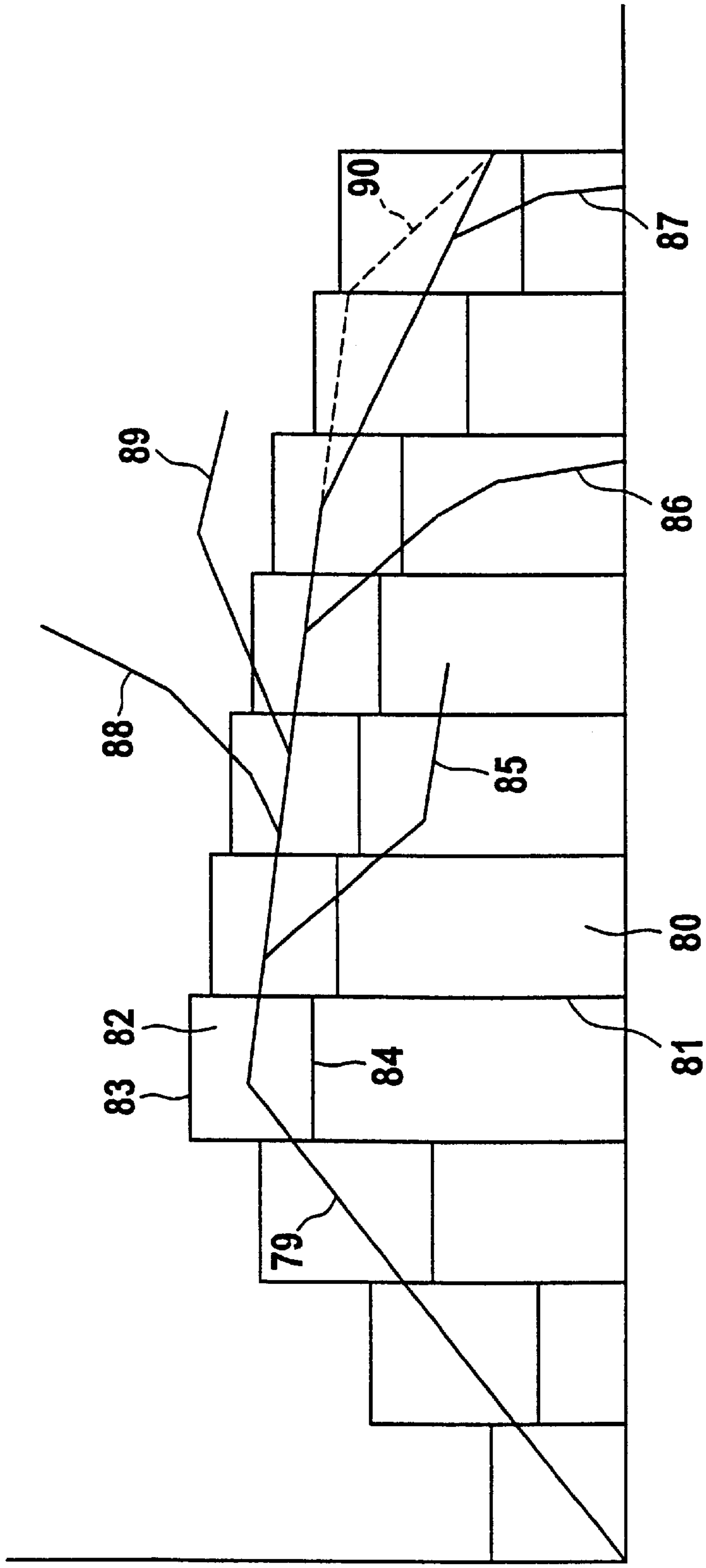
FIG. 5 shows a graph to illustrate the rotation speed regulation system for the control system shown in FIG. 4.

The control operation described above, which is characteristic of a servocontrol system, will be clarified further with reference to FIG. 5. On the graph, the ordinate denotes the rotation speed of drive motor 5, and the abscissa the press travel. The continuous curve 79, which begins at zero, shows the schematic rotation speed profile for a specific pressing tool 3 under normal conditions. It thus corresponds substantially to the pertinent stored setpoint profile. The pressing distance is divided into a series of sections of equal width (labeled, by way of example, 80). At the section boundaries (labeled, by way of example, 81) a setpoint/actual comparison is performed to determine whether curve 79 is still located inside a permissible control corridor (labeled, by way of example, 82). In the case of curve 79, this is the case throughout. Control corridors 82 are delimited at the top and bottom by control limit values (labeled, by way of example, 82 and 82 respectively) which change from section 80 to section 80. All the upper control limit values 83 together constitute an upper control limit value profile, while the lower control limit values 84, taken together, represent a lower control limit value profile. It is understood that the division of the pressing distance into sections 80 is many times finer in microprocessor 63, so that an actual/setpoint comparison is performed correspondingly more often.

Also plotted on the graph is the rotation speed deviation for various types of malfunction. For example, the profile of curve section 85 is characteristic of pressing of a press fitting that is too large for the particular pressing tool 3. Because of the higher geometrical resistance, the rotation speed drops and departs from control corridor 82. Control intervention by way of the phase angle is not capable of preventing the rotation speed from dropping by specifying a higher output. It is moreover characteristic that the rotation speed decrease occurs early on, at a time or distance point at which, with a press fitting of the correct size, a takeup stroke is still being performed.

Curve section 86 is typical of a jam, since the rotation speed drops steeply to zero. Jamming can result, for example, if a foreign object ends up between the moving parts of pressing tool 3. A similar drop in rotation speed is exhibited by curve section 87, but in this case in the final portion of the pressing distance. This indicates creasing on the outside of press fitting 45.

The steeply rising curve section 88 is characteristic of a non-jamming breakage. Since no further resistance is present, the rotation speed increases abruptly.

The profile exhibited by curve section 89 occurs if a press fitting that is too small for the relevant pressing tool 3 is pressed. The resistance is then so low that the rotation speed departs upward from control corridor 82, and cannot be brought back even by adjusting the phase angle. A similar rotation speed profile results if pipe 44 has not been inserted sufficiently into press fitting 45.

The graph also shows the profile for the case of an interruption in the pressing operation. During the resumed pressing which follows, the rotation speed proceeds in accordance with curve 79. In the final region, the curve continues straight ahead in accordance with dashed curve section 90, and then, in the last section, bends downward to adapt to the pressing resistance which re-establishes itself.

For the code of pressing tool 3, it is also possible to provide, instead of resistor 50, an electronic memory chip 100 as depicted with dashed lines in FIG. 4. Said memory chip 100 contains a code which is specific for the relevant press fitting 3, and is connected via line 101 to microprocessor 63.

Instead of a code, a setpoint profile specific for pressing tool 3 can also be stored in memory chip 100. This can be transferred into microprocessor 63 when pressing tool 3 is coupled to drive part 2, and stored therein. This embodiment has the advantage that drive part 2 can be combined with any desired types of pressing tools 3, since each pressing tool 3 has stored in it the setpoint profile specific for it. When a code is provided on the setpoint profiles stored in drive control device 62, in contrast, the combination potential is limited, i.e. drive part 2 cannot be combined with new pressing tools 3 which are intended to have an output profile for which a setpoint profile is not stored in drive control device 62.

Also provided in memory chip 100 are memory locations for storing a residual pressing distance. This residual pressing distance is obtained by means of the following calibration operation.

Jaw closure sensor 54 is set so that it responds, i.e. interrupts circuit 51, while jaw arms 38, 39 have not yet completely reached their final pressed position shown in FIG. 3. Pressing tool 3 is then, on a suitable calibration apparatus or by means of drive part 2 of pressing device 1, brought together several times with a certain force over the full pressing distance, to a final pressed position in which drive arms 36, 37 strike one another's end faces. Using rotation speed pickup 24 and rotation speed sensor 26 as well as a special program, the number of magnetic fields of rotation speed pickup 24 is detected so as to determine the residual pressing distance which is additionally traveled by pressing jaw levers 34, 35 even after jaw closure sensor 54 has responded. This is repeated until the measured residual pressing distances differ only minimally or not at all, i.e. until pressing tool has "set." The residual pressing distance determined thereby is transferred into memory chip 100, and is characteristic for the relevant pressing tool 3. Because of manufacturing tolerances, pressing tools 3 of the same size may exhibit different residual pressing distances.

The calibration process described above ensures that drive motor 5 is shut down in a defined final pressing position which is characteristic of the relevant pressing tool 3. During the pressing operation, jaw closure sensor 54 triggers the distance measurement for the stored residual pressing distance; this occurs by counting the pulses detected by rotation speed sensor 25. Once the residual pressing distance has been covered, drive motor 5 is switched off by shutdown element 66.

Instead of only one residual pressing distance, it is also possible to store multiple residual pressing distances, by performing the calibration operation described above while pressing combinations of press fitting 45 and pipe end 44 which, while having the same external geometry, differ in terms of pressing resistance because of differences in material and/or wall thickness. Because of the elastic behavior of, in particular, pressing tool 3, different residual pressing distances therefore result. If the material and wall thickness of press fitting 45 being pressed are known, the appropriate residual pressing distance can be selected by means of selector switch 76.

Alternatively, the particular suitable residual pressing distance can be selected automatically by detecting the pressing resistance, during the pressing operation, at a specific point in the pressing distance, and utilizing its value as a selection criterion. With the present pressing device 1, this can be done by determining a particular characteristic deviation from curve 79 at the specific location, and utilizing the value of the deviation as the selection criterion. Instead, however, there also exists the possibility of providing an additional actual value sensor for a physical magnitude which corresponds to the pressing resistance, for example in the form of a strain gauge on a stressed part of pressing tool 3, or a torque pickoff on drive shaft 6.

If multiple different setpoint profiles which are matched to the different materials and/or wall thicknesses for press fitting 45 and pipe end 44 are stored in memory chip 100 or in microprocessor 63 for each pressing tool 3, it is possible to allocate the matching residual pressing distance automatically. when the respective setpoint profile is selected in microprocessor 63. This applies both to cases in which the servocontrol system (described above) is provided, and also to a sequence control system (which then has no feedback).

It is not necessary for the residual pressing distance or distances to be stored in memory chip 100. Instead, there exists the possibility of storing the residual pressing distances in drive part 2, and here in particular in microprocessor 63. In this case the residual pressing distance or group of residual pressing distances is activated by the code based on resistor 50 or memory chip 100. It must then be ensured, however, that a matching residual pressing distance or group of residual pressing distances is also in fact stored for each pressing tool 3 to be attached. If a pressing tool 3 were used for which a residual pressing distance or group of residual pressing distances had not yet been stored, the calibration process described above—either using drive part 2 or by means of a special calibration apparatus—would need to be performed again.

What is claimed is:

1. A pressing device (1) for joining workpieces (44, 45), having a pressing tool (3) and a motorized drive for actuation of the pressing tool (3) over a pressing distance, and having a control device (26) which has a drive control device (62) for influencing the drive (5), characterized by the following features:

the drive control device (62) has a malfunction detection device;

the malfunction detection device has an actual value sensor (23, 24, 25);

the actual value sensor (23, 24, 25) is suitable for detecting, as the actual value, a physical magnitude which is correlated with the pressing distance;

at least one limit value profile (83, 84) for the actual value is retained in the malfunction detection device;

the malfunction detection device has a comparison device which, periodically during the pressing operation, checks whether the particular actual value lies on the permissible or impermissible side of the pertinent limit value profile (83, 84); and the malfunction detection device comprises a signal device (78) and/or a shut down device (66) for the drive (5), which are/is activated at any time during the pressing operation from the commencement of the pressing operation until the final pressed position is achieved if the actual value lies on the impermissible side of the pertinent limit value.

2. The pressing device as defined in claim 1, wherein at least one upper and at least one lower limit value profile (83, 84) are retained.

3. The pressing device as defined in claim 2, wherein at least one limit value profile (83, 84) is matched to the profile of the actual value for a correct pressing, constituting a limit value corridor.

4. The pressing device as defined in claim 3, wherein at least one further upper and/or lower limit value profile (83, 84) is/are retained, lying respectively on the impermissible side of the first limit value profile.

5. The pressing device as defined in claim 4, wherein if the actual value lies on the impermissible side of the first limit value profile (83, 84) but still on the permissible side of the adjacent further limit value profile, the signal device (78) is activated; and if the actual value lies on the impermissible side of the further limit value profile as well, the shutdown device (66) is activated.

6. The pressing device as defined in claim 1, wherein the limit value profile or at least one limit value profile (83, 84) is divided into regions (80) over the pressing distance, a specific signal output being associated with each region (80).

7. The pressing device as defined in claim 1, wherein the drive control device (62) has an output control device (67) as actuator; and at least one setpoint profile is retained as command variable, by means of which a manipulated variable corresponding to the setpoint profile is generated in order to influence the output control device (67).

8. The pressing device as defined in claim 1, wherein the output control device (67) and the setpoint profile or profiles are parts of a sequence control system.

9. The pressing device as defined in claim 8, wherein the physical magnitude correlating with the pressing resistance is/are the rotation speed of the drive (5), the force to be applied, the torque to be applied and/or the average electrical current delivered to the drive (5).

10. The pressing device as defined in claim 7, wherein the output control device (67) and the setpoint profile (79) or profiles are part of a servocontrol system.

11. The pressing device as defined in claim 10, wherein the controlled variable of the servocontrol system is the rotation speed of the drive (5).

12. The pressing device as defined in claim 10, wherein the controlled variable of the servocontrol system is identical to the physical magnitude which correlates with the pressing resistance.

13. The pressing device as defined in claim 10, wherein the setpoint profile (79) or each setpoint profile is enclosed by a control corridor (82), defining the control bandwidth, with upper and lower control boundaries (83, 84).

14. The pressing device as defined in claim 13, wherein the control boundaries (83, 84) are identical to the limit value profiles (83, 84).

15. The pressing device as defined in claim 1, wherein multiple limit value profiles (83, 84), and optionally multiple setpoint profiles (79), are defined.

16. The pressing device as defined in claim 15, wherein the limit value profiles (83, 84), and optionally the setpoint profiles (79), are matched to pressing tools of different sizes.

17. The pressing device as defined in claim 15, wherein the pressing device (1) has a material sensor for detecting the material of the workpieces (44, 45), the selection of the limit value profiles (83, 84), and optionally of the setpoint profile (79), being made via the material sensor.

18. The pressing device as defined in claim 16, wherein the limit value profiles (83, 84), and optionally the setpoint profiles (79), are defined for various properties of the workpieces.

19. The pressing device as defined in claim 16, wherein a manually actuable switch arrangement (76) for setting the respective limit value profiles (83, 84), and optionally the setpoint profile (79), are provided.

20. The pressing device as defined in claim 1, wherein the drive control device (62) has a self-adaptation device by means of which the limit value profiles (83, 84), and optionally the setpoint profile (79), can be adapted to the actual pressing resistance.

21. The pressing device as defined in claim 1, wherein correspondingly matched further setpoint profiles (90) and limit value profiles for a partial pressing are associated with the setpoint profile (79) or with each setpoint profile.

22. The pressing device as defined in claim 21, wherein the association of the setpoint profile (90) or profiles for the partial pressing with the setpoint profile (79) or profiles for the full pressing is performed automatically along with selection thereof.

23. The pressing device as defined in claim 1, wherein the pressing tool (3) has a code (50, 100) by means of which the pertinent limit value profiles (83, 84), and optionally the pertinent setpoint profile (79), are determined.

24. The pressing device as defined in claim 23, wherein the code is configured as an electrical or electronic component (50, 100) that is connected to the drive control device (62) via a transfer member.

25. The pressing device as defined in claim 23, wherein the code is configured as a memory chip (100) having at least one limit value profile (83, 84) stored therein.

26. The pressing device as defined in claim 25, wherein the pertinent setpoint profile (79) is also stored in the memory chip (100).

27. The pressing device as defined in claim 25, wherein a device is provided for loading the limit value profiles (83,

84), and optionally setpoint profiles (79), stored in the memory chip (100) into the drive control device (62).

28. The pressing device as defined in claim 25, wherein the pressing distance or a pressing time is stored in the memory chip (100); and when the end of the pressing distance or pressing time is reached, a visible or audible signal is issued, and/or the drive (5) is shut down.

29. The pressing device as defined in claim 25, wherein the pressing tool (1) has a position sensor (54); and a residual pressing distance or residual pressing time is stored in the memory chip (100), the drive being controlled in such a way that if the position sensor (54) is activated, travel occurs only over the residual pressing distance or residual pressing time.

30. The pressing device as defined in claim 1, wherein a locking device to immobilize the drive (5) upon activation of the shutdown device (66) is provided, such that the locking device cannot be bypassed until a special unlocking device is actuated.

31. The pressing device as defined in claim 1, wherein a start sensor (47, 48, 49) to detect the initial position of the pressing tool (3) is provided.

32. The pressing device as defined in claim 1, wherein the control device has a distance sensor and/or time sensor (23, 24, 25) for the pressing operation.

33. The pressing device as defined in claim 32, wherein the distance sensor is configured as a revolution counter (23, 24, 25).

34. A pressing device for joining press fittings to tubular workpieces, comprising:

a. a pressing tool having at least two pressing jaws moveable between an open position and an abutting closed press position;

b. a motorized drive operably associated with said pressing tool for moving said pressing jaws between said open and closed positions; and c. a drive controller operably associated with said drive for controlling operation of said drive and therefore movement of said pressing jaws, said drive controller comprising a malfunction detection device having an actual value sensor for detecting the actual value of a physical magnitude correlated with the pressing distance, a limit value profile for the actual value retained in said malfunction device, a comparison device periodically determining during the pressing operation whether a particular actual value lies on the permissible side or the impermissible side of the pertinent limit value profile, and a signal device and/or a shut down device operably associated with said drive which is/are activated at any time during the pressing operation during movement of the pressing jaws from the open to the closed position, wherein at least one other limit value is retained in said malfunction device lying on an impermissible side of said first mentioned limit value profile so that if the actual value lies on the impermissible side of said first mentioned limit value profile but on the permissible side of said other limit value, said signal device is activated and if the actual value lies also on the impermissible side of said other limit value said shut down device is activated and thereby movement of said pressing jaws stopped.

* * * * *